United States Patent
Lam et al.

(10) Patent No.: US 11,256,568 B2
(45) Date of Patent: Feb. 22, 2022

(54) MEMORY MANAGEMENT SYSTEMS AND METHODS

(71) Applicant: Nvidia Corporation, Santa Clara, CA (US)

(72) Inventors: Bruce Lam, Santa Clara, CA (US); Alok Gupta, Santa Clara, CA (US); David G. Reed, Santa Clara, CA (US); Barry Wagner, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 27 days.

(21) Appl. No.: 16/694,063

(22) Filed: Nov. 25, 2019

(65) Prior Publication Data

US 2020/0089568 A1    Mar. 19, 2020

Related U.S. Application Data

(63) Continuation of application No. 15/367,085, filed on Dec. 1, 2016, now Pat. No. 10,528,423.

(60) Provisional application No. 62/261,801, filed on Dec. 1, 2015.

(51) Int. Cl.
  *G06F 11/10* (2006.01)
  *G06F 3/06* (2006.01)

(52) U.S. Cl.
  CPC .......... *G06F 11/1076* (2013.01); *G06F 3/064* (2013.01); *G06F 3/0619* (2013.01); *G06F 3/0673* (2013.01); *G06F 11/1044* (2013.01)

(58) Field of Classification Search
  CPC ............. G06F 11/1076; G06F 11/1044; G06F 3/0619; G06F 3/064; G06F 3/0673

USPC ......................................................... 714/764
  See application file for complete search history.

(56) References Cited

U.S. PATENT DOCUMENTS

| | | | |
|---|---|---|---|
| 6,754,858 B2 | 6/2004 | Borkenhagen et al. | |
| 7,451,380 B2 | 11/2008 | Carnevale et al. | |
| 7,464,241 B2 | 12/2008 | Vogt | |
| 7,676,730 B2 | 3/2010 | Haugan et al. | |
| 8,359,521 B2 | 1/2013 | Kim et al. | |
| 8,429,494 B2 | 4/2013 | Nakanishi et al. | |
| 8,806,293 B2 | 8/2014 | Tiziani et al. | |
| 9,009,570 B2 | 4/2015 | Troia | |
| 10,552,058 B1* | 2/2020 | Jadon | G06F 3/0655 |
| 2014/0095786 A1* | 4/2014 | Moon | G06F 3/0614 711/109 |
| 2016/0110252 A1* | 4/2016 | Hyun | G06F 11/1044 714/766 |

(Continued)

*Primary Examiner* — James C Kerveros

(57) ABSTRACT

The present invention facilitates efficient and effective utilization of storage management features. In one embodiment, a memory device comprises a memory interface, an ECC generation component, and storage components. The memory interface is configured to receive an access request to an address at which data is stored. The memory interface can also forward responses to the request including the data and ECC information associated with the data. The ECC generation component is configured to automatically establish an address at which the ECC information is stored based upon the receipt of the access request to an address at which data is stored. In one exemplary implementation, the internal establishment of the address at which the ECC information is stored is automatic. The storage components are configured to store the information.

40 Claims, 13 Drawing Sheets

(56) References Cited

U.S. PATENT DOCUMENTS

2017/0139773 A1\* 5/2017 Kang .................... G06F 3/0679
2017/0153945 A1  6/2017 Lam et al.

\* cited by examiner

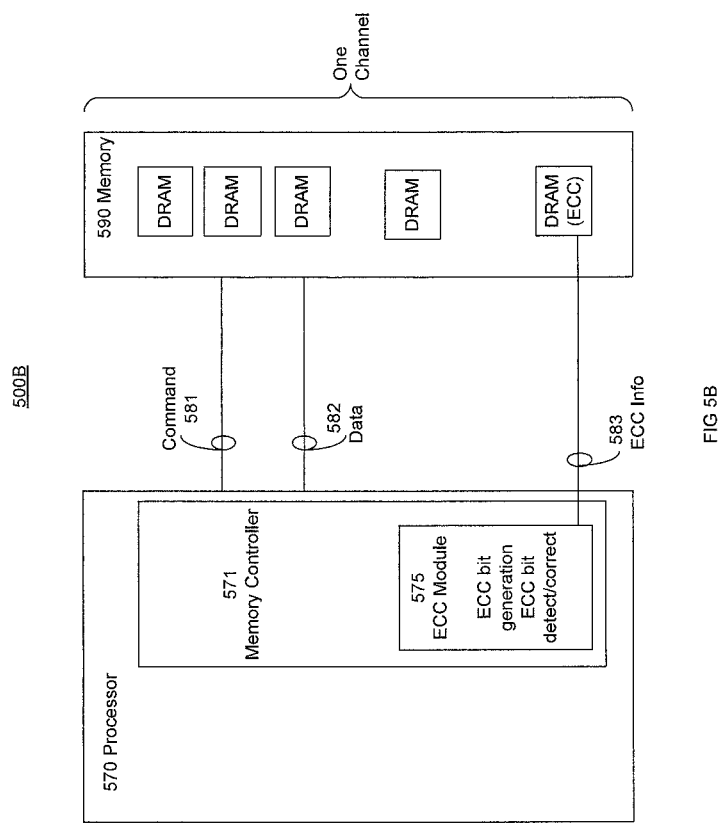

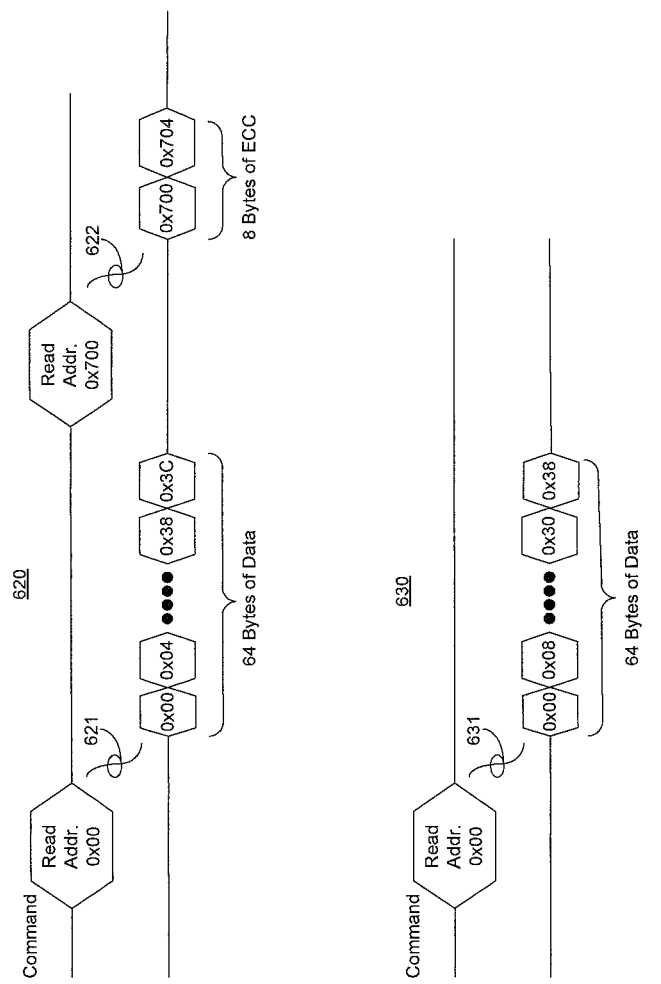

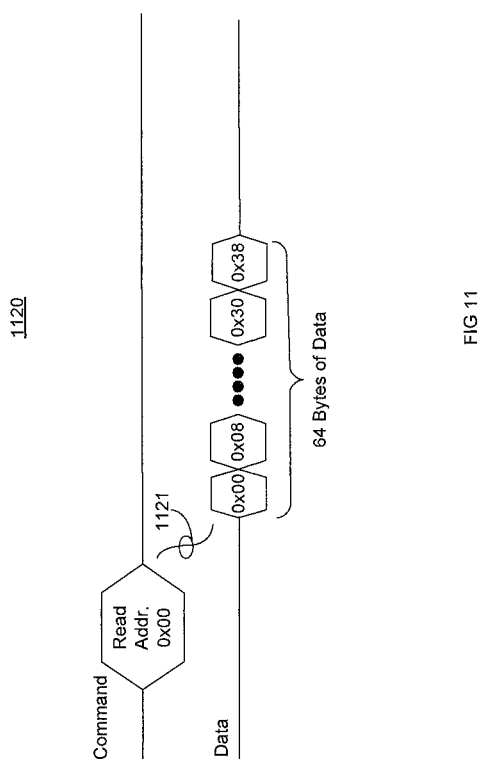

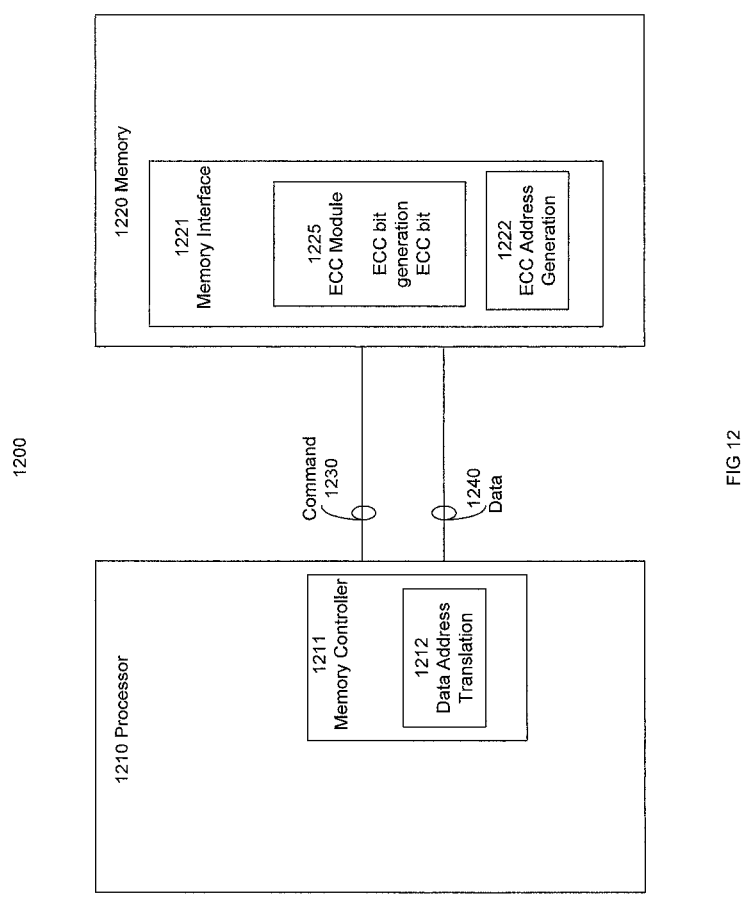

MEMORY MANAGEMENT SYSTEMS AND METHODS

CROSS-REFERENCE TO RELATED APPLICATION

This application is a continuation of U.S. patent application Ser. No. 15/367,085 entitled "Memory Management Systems and Methods," filed on Dec. 1, 2016, which claims the benefit of U.S. Provisional Application Ser. No. 62/261,801, filed on Dec. 1, 2015. The above-listed applications are commonly assigned with the present application and are incorporated herein by reference in their entirety.

FIELD OF THE INVENTION

The present invention relates to the field of information storage system configuration and management.

BACKGROUND OF THE INVENTION

Electronic systems and devices have made a significant contribution towards the advancement of modern society and have facilitated increased productivity and reduced costs in analyzing and communicating information in a variety of business, science, education, and entertainment applications. These electronic systems and devices typically include storage of information in memory components. However, there are a variety of issues that can impact storage or memory performance and reliability.

Conventional approaches to management of storage devices typically involve memory controllers directing the management operations. While these approaches may permit the memory controllers to maintain a fair amount of control, communications and processing between the memory controllers and memory devices can give rise to bandwidth and latency issues. Resolving bandwidth issues can involve balancing resource consumption versus cost. For example, increasing communication bus size can involve increased costs and consumption of limited resources (e.g., semiconductor space, etc.). However, maintaining smaller bus sizes can give rise to slower performance and latency issues. Smaller buses typically mean additional access commands have to be issued, which often add uncertainty to operational characteristics (e.g., access progress, timing behaviors, latency guarantees, etc.).

Some conventional applications have significant requirements for accuracy and speed (e.g., autonomous driving vehicles, medical equipment, high finance applications, etc.). These applications can include measures such as ECC (Error Correcting Code) for accuracy, however these conventional approaches typically require more information (e.g., ECC information, etc.) to be communicated between a processor and a memory. Many of these approaches are implemented on systems with limited bandwidth features and can involve issuance of multiple commands for memory accesses associated with retrieving data and associated ECC information. However, the multiple commands and corresponding processing latency issues can make the operation timing unreliable and non-deterministic. In applications requiring accuracy and speed, unreliable and non-deterministic issues can give rise to serious consequences (e.g., crashes in autonomous driving vehicles, injury in medical procedures using the systems, etc.).

SUMMARY

The present invention facilitates efficient and effective utilization of storage management features. In one embodiment, a memory device comprises a memory interface, an ECC generation component, and storage components. The memory interface is configured to receive an access request to an address at which data is stored. The memory interface can also forward responses to the request including the data and ECC information associated with the data. The ECC generation component is configured to automatically establish an address at which the ECC information is stored based upon the receipt of the access request to an address at which data is stored. In one exemplary implementation, the internal establishment of the address at which the ECC information is stored is automatic. The storage components are configured to store the information.

In one embodiment, the address at which the ECC information is stored is generated depending upon a selective mode. In a first mode the ECC information address is internally established rather than an externally generated ECC address. In a second mode the ECC information address is externally established. The data and the ECC information can be transferred via an interface in a single burst in a first mode. The data is transferred via the interface in a single burst in a second mode and the ECC generation component is disabled in the second mode. The communication of the data and ECC information can have a deterministic latency. The establishment of the address at which the ECC data is stored can be based upon a specific logical bitwise shift and addition amount from the data address. In one embodiment, the establishment of the address at which the ECC data is stored can be based upon a specific logical bitwise shift and logical OR with the data address. In one exemplary implementation, a region of storage locations is reserved for storage of the ECC data. The reserved region of storage locations can be based upon maintaining a ratio of data storage locations to ECC information storage locations. The ratio can be 7/8th of storage locations for data storage and 1/8th of storage locations for ECC and other information In one exemplary implementation, the ECC generation component is selectively engaged and when the ECC tracking component is not engaged ECC information is not stored. In one embodiment, when ECC information is not stored and a portion is not reserved for ECC information. The portion can be made available for storage of other information. In one exemplary implementation, when ECC address information is not internally generated the totality of the storage elements are available for data storage.

In one embodiment, a memory storage method comprises: reserving a first portion of storage capacity for data and a second portion of storage capacity for ECC information; performing an internal ECC address generation process that establishes an internally generated ECC address; storing ECC information in accordance with the internally generated ECC address; and retrieving ECC information in accordance with the internally generated ECC address. Access to the ECC information storage at the internally generated ECC address can be automatically initiated based upon various access activities (e.g., receipt of a write command for data associated with the ECC information, receipt of a read command for data associated with the ECC information, etc.). In one exemplary implementation, a memory storage method further comprises: receiving a request for a specific portion of the data, and forwarding the specific portion of the data and a portion of the ECC information corresponding to the specific portion of the data in response to the request, wherein the latency from the receiving to the forwarding is deterministic. The reserving, the performing the internal ECC address generation process, the storing and the retrieving can be part of a first storage process that is selectively performed. The memory storage method can further comprise a second storage process that is selectively performed. The second storage process includes: storing ECC information in accordance with the externally generated ECC address; and accessing ECC information in accordance with the externally generated ECC address.

In one embodiment, a system comprises a memory selectively configurable to operate in a first mode and a second mode and a processing component that interacts with the memory. In the first mode the memory performs an action with respect to information stored at a specific address identified in the request and also automatically performs a secondary action with respect to information stored at an associated address not included in the request. The second address is internally generated based upon the specific address identified in the request. In on exemplary implementation, the associated address is derived from or implied by the address specified in the request. In the second mode the memory performs an action with respect to information stored at a specific address identified in a request. The processing component is configured to understand that when operating in the second mode: avoid reference to the second set of addresses, and recognize that responses to requests associated with first portion of information or first set of addresses include both the first portion of information and the second portion of information.

In one embodiment, the second mode includes automated internal address relationship tracking that tracks a primary portion of information stored at a first set of addresses and a secondary portion of information stored at a second set of addresses. The memory can automatically respond to a request associated with the first portion of information with a corresponding action to the second portion of information. The request and corresponding action can be directed to writing the primary portion of information in the first set of addresses and the secondary portion of the information at the second set of addresses. The request and corresponding action can be directed to reading the primary portion of information in the first set of addresses and the secondary portion of the information at the second set of addresses. In one exemplary implementation latency is deterministic. The amount of information transferred on an interface for a read or write transaction can be larger in the first mode of operation than it is in the second mode of operation. The primary portion of information can be data and secondary portion of information can be ECC information associated with the data.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 5B is a block diagram of another conventional storage management system in accordance with one embodiment.

FIG. 6 is a block diagram of exemplary conventional accesses to memory.

FIG. 11 is a block diagram of an exemplary access to memory based on operating with internal ECC address generation unselected or disabled in accordance with one embodiment.

FIG. 12 is a block diagram of an exemplary storage management system with ECC internal information generation in accordance with one embodiment.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

In one embodiment, storage systems and methods facilitate increased performance, determinism and reliability through the use of internal memory device related information management. The internal related information management can enable storage locations associated with primary data and corresponding related information to be accessed based upon commands associated with the primary data. In one embodiment, the internal related information management enables storage locations associated with data and related ECC information to be accessed based upon a command associated with the data. The commands can include write commands and read commands. In one exemplary implementation, an address associated with the data is included in a command and a memory device automatically generates or establishes an address for corresponding ECC information to enable access to storage locations for the ECC information. The storage system related information management can facilitate deterministic latency for information access operations.

Figure 1:
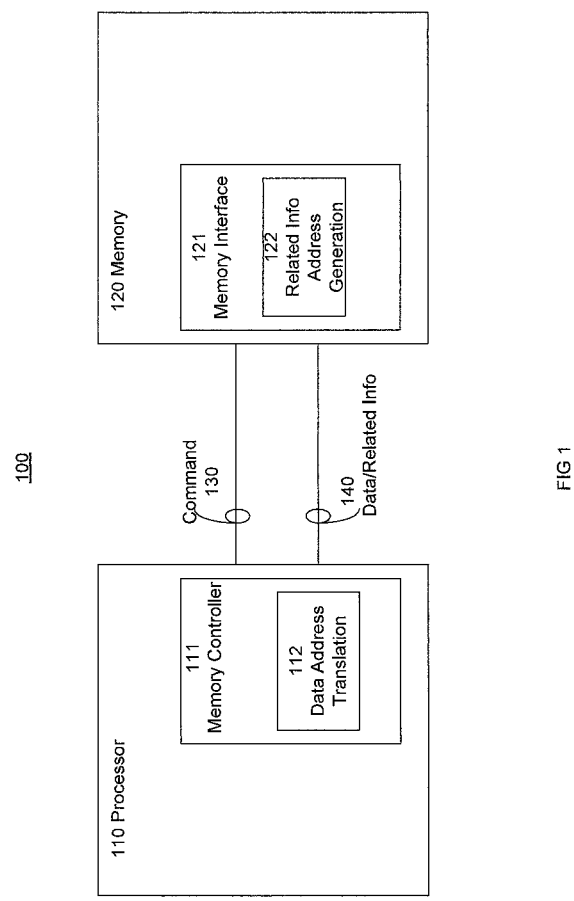
FIG. 1 is a block diagram of an exemplary storage management system in accordance with one embodiment.

FIG. 1 is a block diagram of an exemplary storage management system 100 in accordance with one embodiment. System 100 includes processor 110, memory 120, command bus 130 and data/related information bus 140. Processor 110 includes memory controller 111. Memory controller 111 includes data address translation module 112. In one embodiment, data address translation module 112 maps the physical addresses onto the bank/row/column addresses of the external DRAM thus establishing the physical addresses in memory 120 for storing data. In one embodiment, the related information address generation module 122 also avoids the reserved upper $1/8^{th}$ of each page so no data accesses address that space so it can be used for storage of ECC information. Command bus 130 communicates commands between processor 110 and memory 120. Data/related information bus 140 communicates both data and related information between processor 110 and memory 120. Memory 120 includes memory interface 121 which includes related information address generation module 122. The related information address establishment module 122 generates or establishes physical storage location addresses within memory 120 for information related to the data. In one embodiment, the related information address generation module 122 establishes the addresses without receiving the physical addresses for the related information from the processor 110. It is appreciated that there can be a variety of different relationships between the data and related information. The data and related information can be related by various features, characteristics, and functions (e.g., they can be associated with an application, accuracy provisions, etc.).

Figure 2:
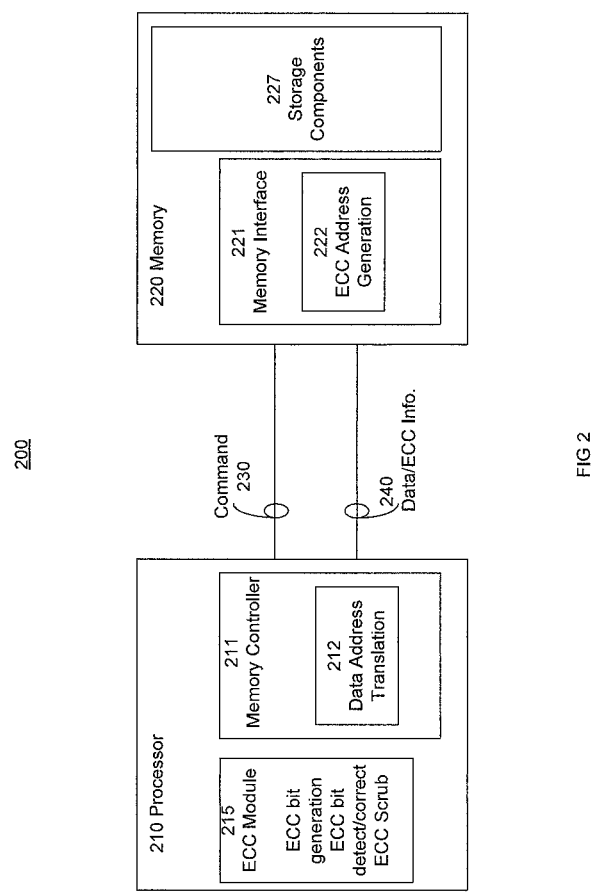
FIG. 2 is a block diagram of an exemplary storage management system in which the related information is ECC information in accordance with one embodiment.

FIG. 2 is a block diagram of an exemplary storage management system 200 in which the related information is ECC information in accordance with one embodiment. System 200 includes processor 210, memory 220, command bus 230 and data/ECC information bus 240. Processor 210 includes memory controller 211 and ECC module 215. Memory controller 211 includes data address translation module 212 which generates or establishes addresses for storing data similar to data address translation module 112. ECC module 215 directs various processing for ECC information associated with the data. The ECC module 215 processing can include ECC bit generation, ECC bit detection and correction, ECC scrubbing and so on. Command bus 230 communicates commands between processor 210 and memory 220. Data/ECC information bus 240 communicates both data and corresponding ECC information between processor 210 and memory 220. In one embodiment, data/ECC information bus 240 is 32 bits wide. Memory 220 includes storage components 227 and memory interface 221 which includes ECC address generation module 222. The ECC address generation module 222 generates or establishes physical storage location addresses within memory 220 for ECC information related to the data. In one embodiment, the ECC address generation module 222 establishes the ECC addresses without receiving the ECC information physical storage addresses from the processor 210. Storage components 227 are configured to store information. In one embodiment, memory 220 is a dynamic random access memory (DRAM). It is appreciated that multiple memories or DRAMs (not shown) can be coupled to memory controller 211.

In one embodiment, some ECC operations (e.g., the ECC generation, detecting, scrubbing, etc.) are performed in the memory controller. The ECC operations allow for protection of information accuracy in both the DRAM array and the interface between a memory controller (MC) and DRAMs of the DRAM array. In one exemplary implementation, the overhead for a DRAM is kept simple as the physical address to modified RBC (Row/Bank/Column) address is performed by the memory controller. In one embodiment, the column address presented to the DRAM can be identical to that presented in traditional operations with the exception that an address presented to the DRAM from an external source not occur to a portion of a memory device assigned to storage of the related information such as ECC information.

In one embodiment, $1/8^{th}$ of a storage page is assigned to storage of ECC information. In one exemplary implementation, the modified RBC address for a DRAM with a 0x800 byte page is determined in accordance with the following properties:
COL_ADDR'=PHYSICAL_ADDRESS MOD 0x700
CS_BANK_ROW_ADDR'=PHYSICAL_ADDR/0x700
In one embodiment, a DRAM internally uses a few of the upper column bits as an address into the ECC portion of the page. In one exemplary implementation, this involves only simple binary math to fetch the 8 ECC bytes per burst:
ECC_base=0x700+COL_ADDR>>3
In one exemplary implementation, a burst of 16 data beats is used with a 32 bit data bus width (4 bytes) giving a 4×16 or 64 byte transaction. This 64 bytes which is protected by 8 bytes of ECC information which takes an additional 2 beats to transfer on the bus. In one exemplary implementation, this corresponds to addresses 0x700 and 0x704 in the portion of memory reserved for ECC information. It is appreciated that a portion of memory reserved for ECC information can be in a variety of locations (e.g., end of the page, at the beginning of a page, or interleaved). Similarly, a transfer of ECC information can occur in various locations within a communication burst (e.g., at the end of the burst on the data/ECC interface, at the beginning or interleaved provided it is included somewhere as part of the burst, etc.).

A side effect of sharing the DRAM array between storage of both data and ECC information can involve reduction of the total data capacity of each die as observed by a memory controller or user. The reduction of total data capacity can result in storage capacities with fractional or decimal number storage indications. In some areas or applications this may be a difficult concept for users to get used to because they are accustomed to buying/using products with whole number indications of the memory capacity (e.g., 1 GB, 100 MB, 4 GB, etc.). However in other areas or applications (e.g., servers, embedded systems, cloud resources, self driving vehicles, etc.) users are more focused on storage configurations with characteristics and features that are beneficial for the particular uses or applications. In one exemplary implementation, the possibility of a fractional or decimal storage capacity is less of an issue since the use or application drives the capacity requirements.

A key benefit of the memory device related information management is to provide a minimally invasive modification to standard DRAMs that enable them to be more robust in data critical applications. In one embodiment, minor modifications to logic are utilized to implement DRAM ECC address generation. This can help meet an important typical limitation for DRAMs which usually have very limited logic resources due to process choices and cost pressures. In some situations, presented embodiments can permit vendors to selectively differentiate their standard product functionally and enable the possibility of charging a premium for the feature.

Figure 3:
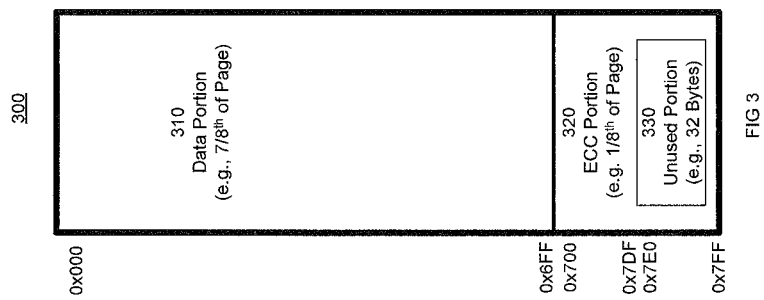
FIG. 3 is a block diagram of an exemplary DRAM storage configuration in accordance with one embodiment.

FIG. 3 is a block diagram of an exemplary DRAM storage configuration 300 in accordance with one embodiment. DRAM storage configuration 300 includes data portion 310, ECC portion 320 and Unused portion 330. Data portion 310 stores the data and ECC portion 320 stores ECC information associated with the data. Unused portion 330 is a few bytes in the ECC portion 310 that are unused for ECC storage. In one embodiment, the unused portion 330 while not used for ECC storage can be used for storing other information. In one embodiment, the ratio of the data portion 310 storage capacity to the ECC portion 320 storage capacity is $7/8^{th}$ for data and $1/8^{th}$ for ECC information. Even though 1/8th of the storage capacity can be reserved for the ECC information, in one embodiment only 7/64 is actually used for storing ECC information leaving 1/64 unused or available for storing something else. In one exemplary implementation, data portion 310 starts at address 0x000 and ends at address 0x6FF, ECC portion 320 starts at address 0x700 and ends at address 0x7FF, of which address 0x700 to address 0x7DF is used to store ECC information and address 0x7E0 to address 0x7FF is unused for ECC information.

Figure 4:
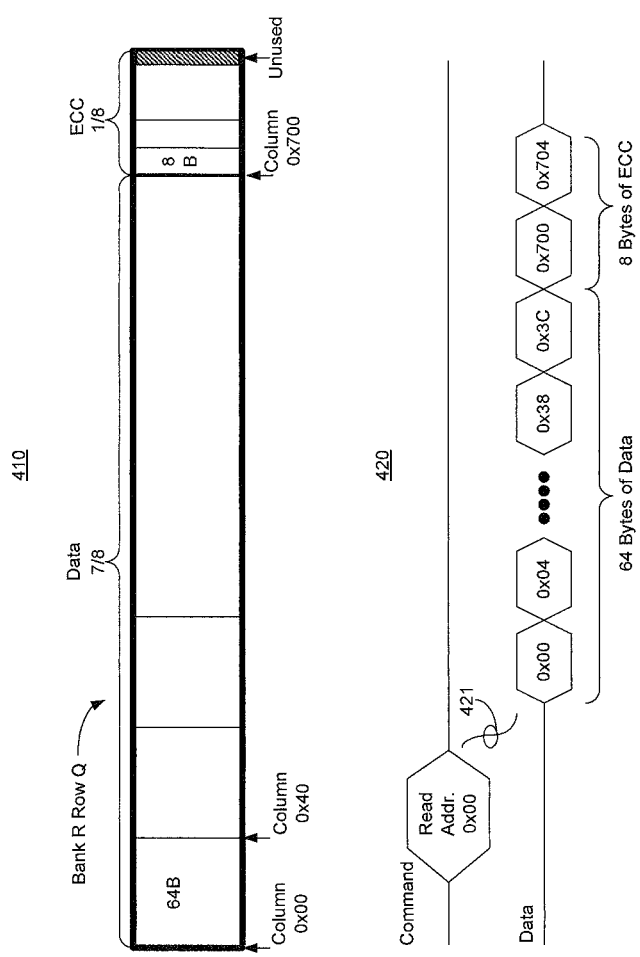
FIG. 4 is a block diagram of an exemplary access to memory in accordance with one embodiment.

FIG. 4 is a block diagram of an exemplary access to memory storage 410 in accordance with one embodiment. In one exemplary implementation, the access is a read operation 420 of information stored in memory storage 410, which is a 4 Byte wide DRAM in one exemplary implementation. The read request is directed to data stored in bank R row Q of a DRAM array starting at column address 0x00. The read request is received by the DRAM on a command interface. The read request is for 64 Bytes of data stored between column address 0x00 and 0x3F inclusive. A column decoder decodes the column addresses (e.g., Column 0x00, 0x40, 0x700, etc.). After a latency of 421, forwarding of the requested data begins on a data communication interface starting with data at address 0x00. In one embodiment, 64 Bytes of data are forwarded in response to the access request (e.g., four byte data quanta stored at address locations 0x00, 0x04 through 0x38 and 0x3C). The DRAM automatically establishes the address locations for ECC information associated with 64 Bytes of data, retrieves the ECC information from the address locations, and forwards the ECC information. In one exemplary implementation, 8 Bytes of ECC information are automatically forwarded in response to the read request (e.g., four byte ECC information quanta stored at address locations 0x700 and 0x704. In one embodiment, a total of 72 bytes are transferred representing 64 bytes of data and 8 bytes of ECC information.

In one embodiment, the memory is configured or organized in storage chunks or portions of 64 Bytes. It is appreciated the access requests can be directed to storage chunks or portions of various sizes. With reference to FIG. 4, in an alternate configuration the information stored in memory 410 Bank R Row Q can be configured or organized in storage chunks or portions of 32 Bytes and stored at column address 0x00 and 0x1F inclusive. The ECC information can be 4 Bytes in the alternate implementation.

Figure 5A:
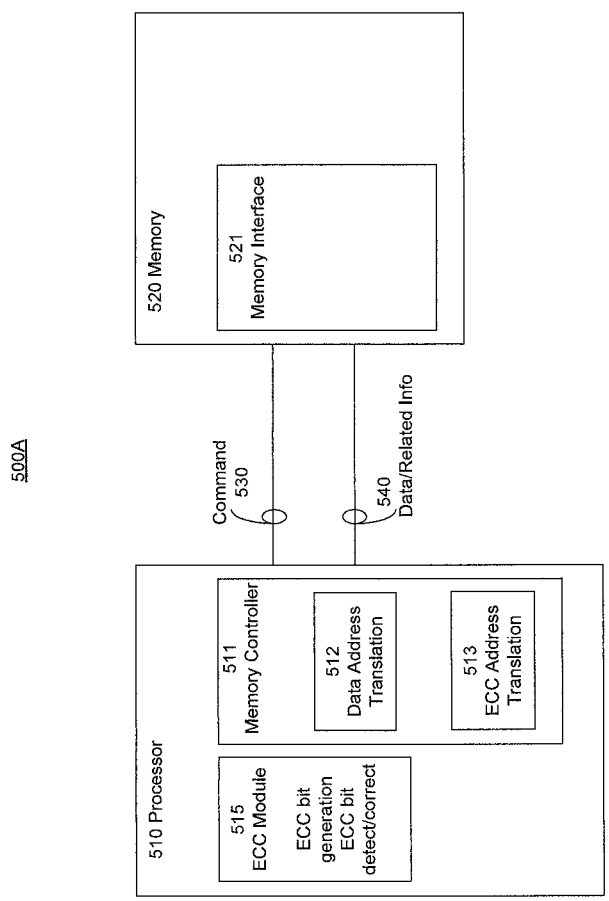
FIG. 5A is a block diagram of a conventional storage management system in accordance with one embodiment.

In memories, 220 and 410 addresses for the ECC information is generated internally, unlike exemplary conventional storage management system 500A illustrated in FIG. 5A. System 500A includes processor 510, memory 520, command bus 530 and data/related information bus 540. Processor 510 includes memory controller 511 and ECC module 515. Memory controller 511 includes data address translation module 512 which generates or establishes RBC addresses in memory 520 for storing data. Memory controller 511 also includes ECC address translation module 513 which generates or establishes RBC addresses in memory 520 for storing ECC information. ECC module 515 directs various processing for ECC information associated with the data. Data/related information bus 540 communicates both data and corresponding ECC information between processor 510 and memory 520. Memory 520 stores the data and ECC information received from processor 510. The memory interface 521 depends upon receipt from the processor 510 of both a storage location address for the data and a storage location address for the ECC information.

In some conventional approaches, additional interface links are provided for the ECC information. FIG. 5B is a block diagram of exemplary conventional storage management system 500B. Storage management system 500B includes processor 570, memory 590, command bus 581 and data 582 and ECC information bus 583. Processor 570 includes memory controller 571 which includes ECC module 575. Memory controller 571 generates or establishes RBC addresses in memory 590 for storing data and ECC information. Data bus 580 communicates data and ECC information bus 583 communicates ECC information between processor 570 and memory 590. Memory 590 stores the data and ECC information received from processor 570. In one embodiment, memory 590 includes a plurality of DRAMs. The DRAMs can be organized in a dual in-line memory module (DIMM) configuration. It is appreciated other embodiments can have multiple DIMMs (not shown). The memory 590 includes a DRAM for storage of the ECC information. Basically an extra DRAM is supplied for storage of the ECC information. So to store a certain amount of ECC information extra storage space has to be provided for the ECC information. In one embodiment, there is ratio of 9:8 of (data+ECC info):data. In one embodiment, the requirement for an extra DRAM is unlike the internally generated ECC information address DRAM that can accommodate ECC information storage in the same DRAM as the data.

FIG. 6 is a timing diagram of conventional exemplary accesses to memory in accordance with one embodiment. In one exemplary implementation, the access is a read operation 620 of information stored in memory 520, which can be a 4 Byte wide DRAM. A read request to data stored at address 0x00 is received on a command interface. After a latency of 621, forwarding of the requested data begins on a data communication output starting with data at address 0x00. In one embodiment, 64 Bytes of data are forwarded in response to the access request (e.g., four byte data quanta stored at address locations 0x00, 0x04 through 0x38 and 0x3C). The access to the ECC information associated with 64 Bytes of data depends upon receiving a second request which provides the storage location address for the ECC information.

A second read request to data stored at address 0x700 is received on a command interface. After a latency of 622 forwarding the requested data begins on a data communication output starting with data at address 0x700. In one embodiment, 8 Bytes of relevant data are forwarded in response to the ECC information access request (e.g., four byte data quanta stored at address locations 0x700 and 0x704). As illustrated in FIG. 6, conventional exemplary access to memory 620 includes a second read request for the ECC information, unlike the memory access illustrated in FIG. 4 in which the DRAM establishes ECC address automatically. In many DRAMs the minimum data burst is more than the 2 beats required to access the ECC information as illustrated in the read to address 0x700. Hence there is often more data read than is required, occupying valuable slots on the data interface and lowering system efficiency.

In one exemplary implementation, the access is a read operation 630 of information stored in memory 590. A read request to data stored at address 0x00 is received on a command line input. After a latency of 631, forwarding of the requested data begins on a data communication output starting with data at address 0x00. In one embodiment, 72 Bytes of data are forwarded in response to the access request (e.g., data stored at address locations 0x00, 0x08 through 0x30 and 0x38). The data interface width in this example is 9 bytes wide consisting of 8 bytes for data and 1 byte for ECC information. The burst of 8 data beats therefor transfers a total of 72 bytes.

Figure 7:
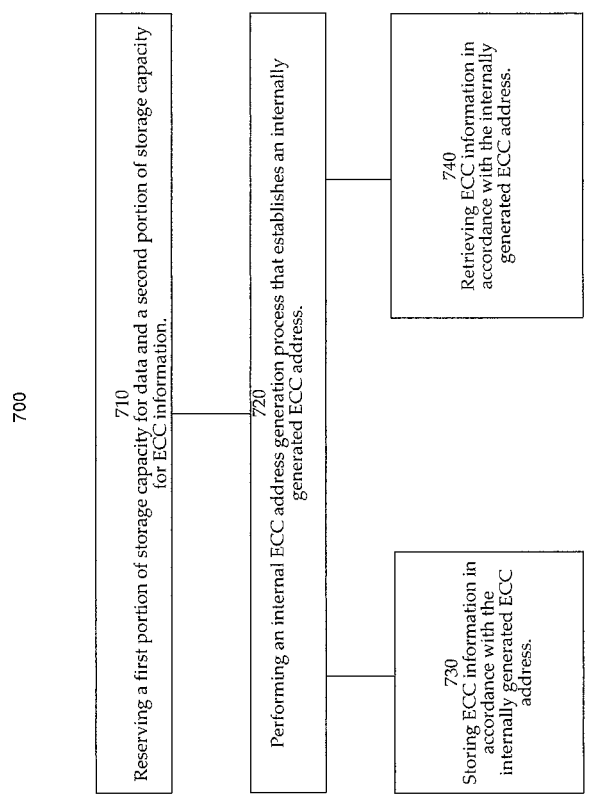
FIG. 7 is a flow chart of memory storage method in accordance with one embodiment.

FIG. 7 is a flow chart of memory storage method 700 in accordance with one embodiment.

In block 710, a first portion of storage capacity for data and a second portion of storage capacity for ECC information are reserved. In one embodiment, block 710 is performed once at a power up or reset.

In block 720, an internal ECC address generation process that establishes an internally generated ECC address is performed. In one embodiment the internal ECC generation process includes a shift and a logical ADD based upon a received address associated with the data. In another embodiment, the internal ECC generation process includes a shift and a logical OR based upon a received address associated with the data. In one exemplary implementation, the received data addresses are mapped to the first 7/8 of a DRAM column address range and data addresses do not include locations in portions reserved for the ECC information.

In block 730, ECC information is stored in accordance with the internally generated ECC address. In one embodiment, storage of ECC information at the internally generated ECC address is automatically initiated based upon receipt of a write command for data associated with the ECC information.

In block 740, ECC information is retrieved in accordance with the internally generated ECC address. In one embodiment, access to ECC information at the internally generated ECC address is automatically initiated based upon receipt of a read command for data associated with the ECC information.

In one embodiment, the information access process includes receiving a request for a specific portion of the data, and forwarding the specific portion of the data and a portion of the ECC information corresponding to the specific portion of the data in response to the request, wherein the latency from the receiving to the forwarding is deterministic.

It is appreciated the present approach is compatible with various implementations. In one embodiment, the reserving, internal ECC address generation process, storing and accessing are part of a first storage process that is selectively performed. In one exemplary implementation, a second storage process is selectively performed wherein the second storage process includes: storing ECC information in accordance with the externally generated ECC address; and accessing ECC information in accordance with the externally generated ECC address.

Figure 8:
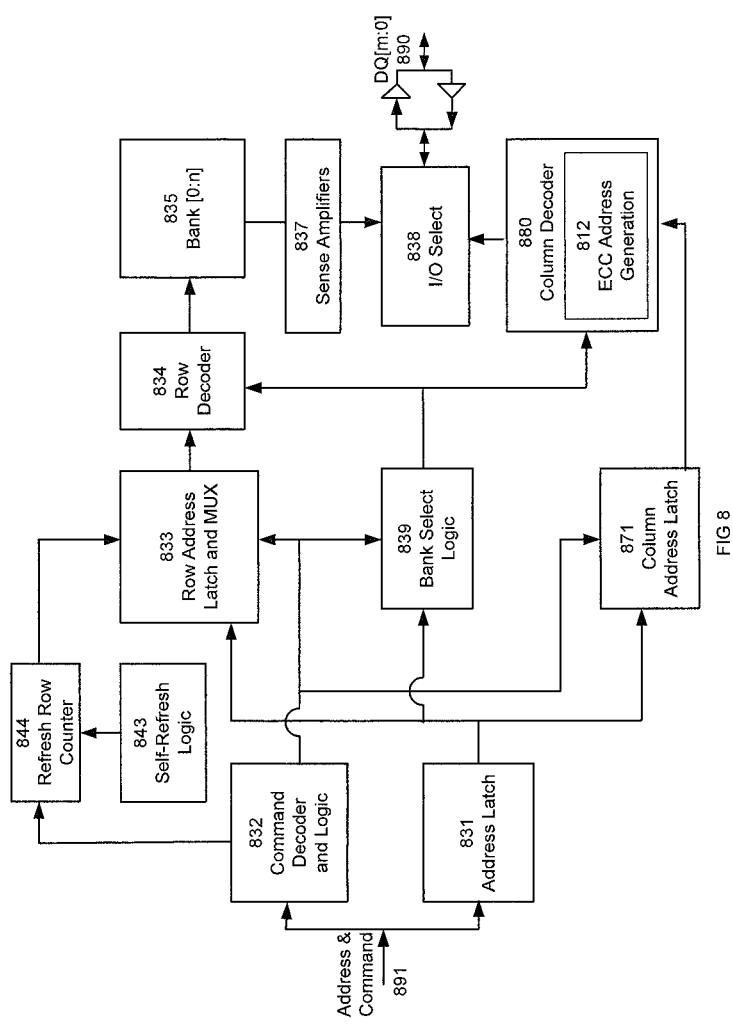
FIG. 8 is a block diagram illustrating an exemplary DRAM in accordance with one embodiment.

FIG. 8 is a hardware block diagram illustrating an exemplary DRAM in accordance with one embodiment. Addresses 891 are received and latched into the address latch 831 while commands 891 are received and decoded by command decoder and logic module 832. The row address is latched into the row address latch and multiplexer module 833 while the column address is latched into the column address latch module 871.

To reduce access latency, DRAM is split into multiple equal-sized units called banks. Most DRAM chips have a multi-bank architecture and can be organized in banks, rows, and columns. Bank select logic module 839 selects the appropriate bank from Bank [0:n] 835 for access using the address information. A typical 512 MBit SDRAM chip, for example, comprises 4 independent 128 Mbit memory banks. Each row in a bank is an array of 16,384 bits each. A bank is idle, active, or changing state from one to the other.

Using row decoder 834, the row address is applied to the selected bank from Bank [0:n]. The row address decoder selects the proper row to be sent to the sense amplifiers 837. The "active" command activates an idle bank. For example, it can present a two-bit bank address and a 13-bit row address and cause a read of that row into 16,384 column sense amplifiers 837. This is also referred to as "opening" the row or "opening" a page.

Sense amplifiers 837 are also known as "row-buffers" and provide access to the row, which is open at the bank. Before a memory location can be read, the entire row containing that memory location is opened and read into the row buffer. The page (row) data stays in the row buffer until the page is explicitly closed. If an access to the open page data arrives at the memory controller, it can be serviced immediately from the row buffer. If an access to another row in that bank arrives at the memory controller, the current row must be closed and the new row must be opened before the request can be forwarded to the DRAM for servicing.

Once the row has been activated, "read" and "write" commands are possible to that row. Both read and write commands require a column address. The column address is provided using column decoder 880 to I/O select module 838. For a read operation requested data is then read and the output data is placed on the DQ lines 890. For a write operation, write data are written to the row buffer at the selected column address.

A write command is accompanied by the data to be written driven on to the DQ lines 890. It is the duty of the memory controller to ensure that the DRAM is not driving read data on to the DQ lines at the same time that it needs to read write data from those lines. The data is written into sense amplifiers 837 through IO select module 838. Again, column decoder 880 is used to select the appropriate column to which data can be written. During a write to a particular cell, all the columns in a row are sensed simultaneously just as during reading, so although only a single column's storage-cell capacitor charge may be changed, the entire row is refreshed (written back in).

The charge on the DRAM memory cells will dissipate away naturally over time due to many factors that can influence the leakage rate including temperature. A marked reduction in stored charge can result in data loss. In order to prevent this from happening, the DRAM must be periodically refreshed by boosting the charge contained in each individual memory cell. Typically, manufacturers specify that each row must have its storage cell capacitors refreshed every 64 ms or less. In most cases, refresh cycles involve restoring the charge along an entire page. Over the course of the entire DRAM Refresh interval, every page is accessed and subsequently restored. At the end of the interval, the process begins again.

DRAMs will typically also comprise a refresh row counter 844 to keep track of the last row that was refreshed—this row counter is used to determine the rows that must be refreshed next. A bank must be idle for a minimum period before the Refresh (REF) command can be applied. The refresh command is generated by circuits in the memory controller. The refresh counter 844 typically contains the address of the row to be refreshed which is applied to the chip's row address lines and the counter increments after completion of a refresh operation. When a refresh has completed, the corresponding bank is left in idle state. Some memory controllers may use a Refresh All command which refreshes all banks in the DRAM simultaneously. Others may use the per-bank refresh command and to handle independent bank refresh, the DRAM may have a copy of counter 844 per bank.

When a DRAM is not being actively utilized it can be transitioned to a low power mode during which the DRAM internally performs a periodic refresh to maintain data integrity also known as a self-refresh. This can be performed by the memory controller issuing a Self-Refresh command to sequence the DRAM into Self-Refresh state. The memory controller does not initiate an explicit Refresh command when DRAM is in self-refresh state. Typically, self-refresh logic module 843 is used in conjunction with the DRAMs internal refresh row counter 844 to keep track of the rows being refreshed. Self Refresh Logic 843 contains timing logic to periodically trigger new internal refresh operations.

In one embodiment, column decoder 880 includes ECC address generation component 812. In one exemplary, implementation ECC address generation component 812 is similar to ECC address generation component 222. The ECC address generation module 812 generates or establishes physical storage location addresses within sense amplifier 837 for ECC information related to the data. In one embodiment, the ECC address generation module 812 establishes the ECC addresses without receiving the ECC information physical storage addresses from an external memory controller.

It is appreciated the present approach is compatible with various configurations. Page sizes other than 2 KB (including non-power of 2 page sizes) that might result from a standard DRAM with its own ECC bits can be used. The ratios between different configuration characteristics can vary. For example, bursts length ratios other than 18:16 (including no change for the second embodiment), the ECC ratios can include ratios other than 8:1, MC Address translations other than 8:7, and so on. Mode resetting in the DRAM can enable/disable the various embodiments/modes of operation and address ranges. Mode register write might be via existing scheme or over CA or data or a hybrid interface Mode where only a portion of the total address range is end to end ECC enabled (hence only accesses to those pages[or blocks]carry the additional ECC data beats and associated loss of capacity/bandwidth).

Figure 9:
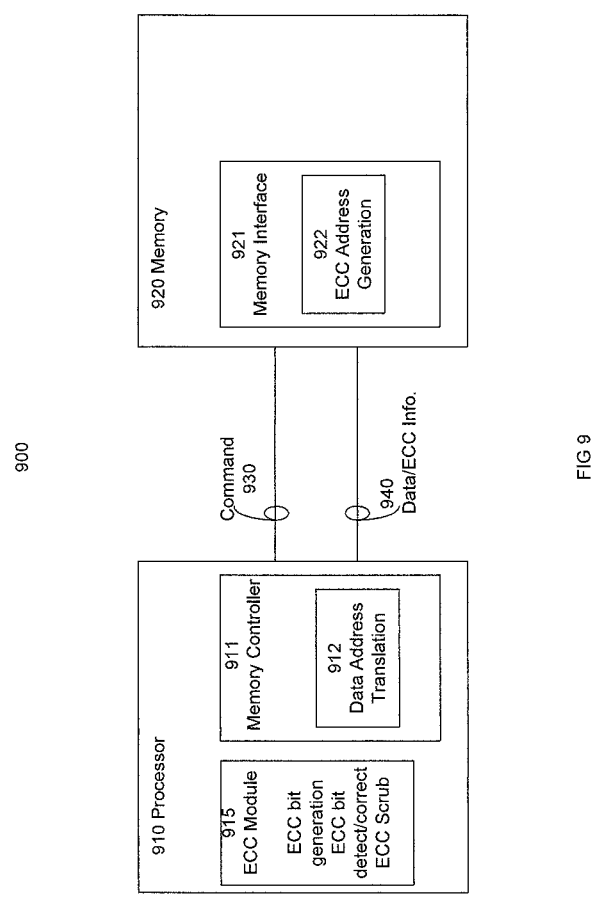
FIG. 9 is a block diagram of an exemplary storage management system with selective mode of operation in accordance with one embodiment.

FIG. 9 is a block diagram of an exemplary storage management system 900 in accordance with one embodiment. Storage management system 900 selectively operates in two modes. In the first mode, the storage management system 900 performs ECC address generation in the memory 920 and in the second mode memory 920 does not perform ECC address generation. In the second mode storage management system 900 can receive ECC address information from an external source or store information without ECC protection.

In one embodiment, system 900 is similar to system 200. System 900 includes processor 910, memory 920, command bus 930 and data/ECC information bus 940. Processor 910 includes memory controller 911 and ECC module 915. Memory controller 911 includes data address translation module 912 which generates or establishes RBC addresses in memory 920 for storing data. ECC module 915 directs various processing for ECC information associated with the data. Command bus 930 communicates commands between processor 910 and memory 920. Data/ECC information bus 940 communicates both data and corresponding ECC information between processor 910 and memory 920. Memory 920 includes memory interface 921 which includes ECC address generation module 922. The ECC address generation module 922 can selectively generate or establishes physical storage location addresses within memory 920 for ECC information related to the data based upon whether the storage management system is operating in an internal ECC address generation mode or not.

Figure 10:
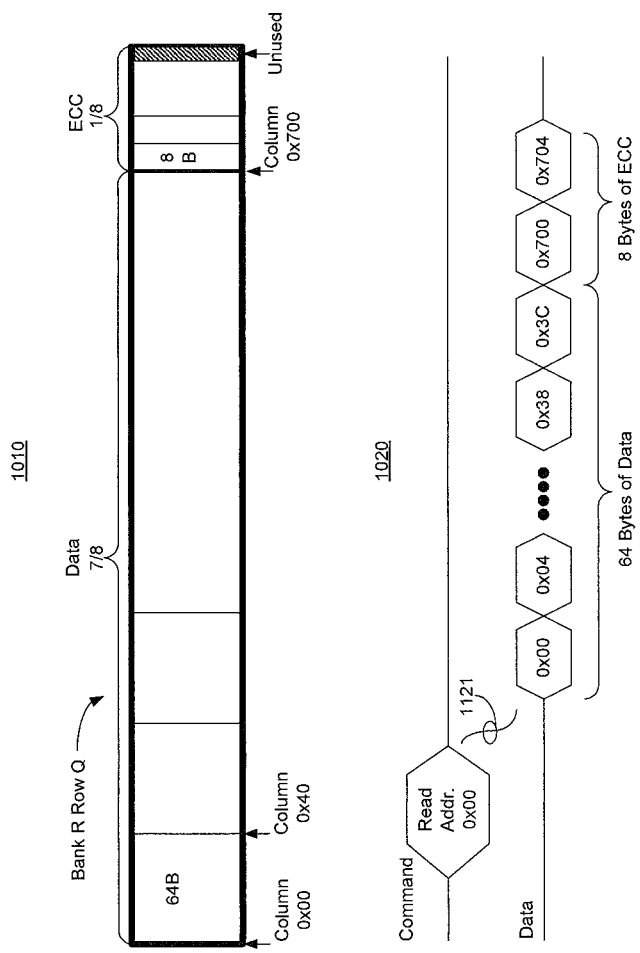
FIG. 10 is a block diagram of an exemplary access to memory based on operating in an internal ECC address generation mode in accordance with one embodiment.

FIG. 10 is a block diagram of an exemplary access to storage locations in memory 920 based on operating in an internal ECC address generation mode in accordance with one embodiment. The access to the storage locations can be based upon receipt of a command (e.g., a read command, a write command, etc.). In one exemplary implementation, memory 920 is organized in accordance with configuration 1010 and the access is a read operation 1020 of information stored in memory 920. The memory 920 can be a 4 Byte wide DRAM in one exemplary implementation. The read request is directed to data stored in bank R Row Q of a DRAM array starting at address 0x00 is received on a command interface. The read request includes data in the 64 Bytes of data stored between column address 0x00 and 0x3F inclusive. A column decoder decodes the column addresses (e.g., Column 0x00, 0x40, 0x700, etc.). After a latency of 1021 forwarding the requested data begins on a data communication output starting with 4 bytes of data at address 0x00. In one embodiment, 64 Bytes of data are forwarded in response to the access request (e.g., 4 byte data quanta stored at address locations 0x00, 0x04 through 0x38 and 0x3C). The DRAM automatically establishes the address locations for ECC information associated with 64 Bytes of data and automatically forwards the ECC information. In one exemplary implementation, 8 Bytes of ECC information are automatically forwarded in response to the access request (e.g., ECC information stored at address locations 0x700 and 0x704.

FIG. 11 is a block diagram of an exemplary access to memory 920 based on operating with an internal ECC address generation mode unselected or disabled in accordance with one embodiment. In one exemplary implementation, the access is a read operation 1120 of information stored in memory 920. A read request to data stored at address 0x00 is received on a command line input. After a latency of 1121 forwarding the requested data begins on a data communication output starting with data at address 0x00. In one embodiment, 64 Bytes of data are forwarded in response to the access request (e.g., data stored at address locations 0x00, 0x08 through 0x30 and 0x38). In one embodiment, 64 Bytes of data are forwarded in response to the access request (e.g., 4 byte data quanta stored at address locations 0x00, 0x04 through 0x38 and 0x3C). The access to the ECC information associated with 64 Bytes of data depends upon receiving a second request which provides the storage location address for the ECC information.

In one embodiment, the ECC detection and correction is handled entirely inside the DRAM. This has the benefit of reducing the performance loss on the MC_DRAM interface due to the extended burst length, however it only protects the array and does not protect the data all the way to the MC. In one exemplary implementation, the MC still needs to avoid accessing a fraction of the DRAM array per column so it can be used for ECC data.

FIG. 12 is a block diagram of an exemplary storage management system 1200 in accordance with one embodiment. System 1200 includes processor 1210, memory 1220, command bus 1230 and dataECC bus 1240. Processor 1210 includes memory controller 1211. Memory controller 1211 includes data address translation module 1212 which generates or establishes RBC addresses of data storage locations in memory 1220. Command bus 1230 communicates commands between processor 1210 and memory 1220. DataECC bus 1240 communicates data between processor 1210 and memory 1220.

Memory 1220 includes memory interface 1221 which includes ECC address generation module 1222 and ECC module 1225. ECC module 1225 directs various processing for ECC information associated with the data. The ECC module 1225 processing can include ECC bit generation, ECC bit detection and correction, ECC scrubbing and so on. The ECC address generation module 1222 generates or establishes physical storage location addresses within memory 1220 for ECC information related to the data. In one embodiment, the ECC address generation module 1222 establishes the ECC addresses without receiving the ECC information physical storage addresses from the processor 1210

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

It is appreciated that embodiments of the present invention can be compatible and implemented with a variety of different types of tangible memory or storage (e.g., RAM, DRAM, flash, hard drive, CD, DVD, etc.). The memory or storage, while able to be changed or rewritten, can be considered a non-transitory storage medium. By indicating a non-transitory storage medium it is not intend to limit characteristics of the medium, and can include a variety of storage mediums (e.g., programmable, erasable, nonprogrammable, read/write, read only, etc.) and "non-transitory" computer-readable media comprises all computer-readable media, with the sole exception being a transitory, propagating signal.

It is appreciated that the following is a listing of exemplary concepts or embodiments associated with the novel approach. It is also appreciated that the listing is not exhaustive and does not necessarily include all possible implementation. The following concepts and embodiments can be implemented in hardware. In one embodiment, the following methods or process describe operations performed by various processing components or units. In one exemplary implementation, instructions, or directions associated with the methods, processes, operations etc. can be stored in a memory and cause a processor to implement the operations, functions, actions, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A method of servicing a read command by a memory device, comprising:
   receiving a first address for a set of data bits;
   retrieving the set of data bits from a first location of the memory device using the first address;
   generating a second address by shifting the received first address and performing a logical operation thereon;
   retrieving a set of error correcting code (ECC) bits from a second location of the memory device using the second address, wherein the second location is different from the first location, wherein the set of ECC bits is associated with the set of data bits; and
   transmitting the set of data bits and the set of ECC bits together in a single burst.

2. The method of claim 1, wherein the set of the data bits represents a plurality of data values and each data value is a byte of information.

3. The method of claim 1, wherein the set of the data bits represents a plurality of data values and each data value is four bytes of information.

4. The method of claim 1, wherein the set of the data bits represents a plurality of data values each data value is a fixed number of bits of information, wherein the fixed number is equal to a bit width of a data bus of the memory device, wherein the data bus of the memory device is used to transmit the data bits and the ECC bits.

5. The method of claim 1, wherein the step of transmitting the set of data bits and the set of ECC bits together in a single burst comprises transmitting all of the set of data bits and the set of ECC bits consecutively prior to transmitting any other set of data bits and any other set of ECC bits.

6. The method of claim 1, wherein the logical operation is an AND operation or an OR operation.

7. The method of claim 1, wherein the memory device includes a first portion for storing the data bits, and a second portion for storing the ECC bits.

8. The method of claim 7, wherein the first portion represents 7/8 of the memory device and the second portion represents 1/8 of the memory device.

9. The method of claim 1, wherein the memory device is operable in a first mode and a second mode, wherein when the memory device is operating in the first mode, the memory device performs a first set of steps comprising the generating, the retrieving the set of ECC bits, and the transmitting the set of data bits and the set of ECC bits together in the single burst, and
wherein when the memory device is operating in the second mode, the memory device does not perform the first set of steps but instead performs a second set of steps comprising transmitting the set of data bits in a single burst.

10. The method of claim 1, wherein the memory device is a dynamic random access memory (DRAM).

11. A method of servicing a read command by a memory device, comprising:
receiving a first address for a set of data bits;
retrieving the set of data bits from a first location of the memory device a-using the first address;
generating a second address by shifting the received first address and performing a logical operation thereon;
retrieving a set of error correcting code (ECC) bits from a second location of the memory device using the second address, wherein the second location is different from the first location, wherein the set of ECC bits is associated with the set of data bits; and
transmitting the set of data bits and the set of ECC bits together in a single burst, wherein the addresses associated with the set of data bits and the set of ECC bits do not form a consecutive, sequential set of addresses.

12. The method of claim 11, wherein the set of the data bits represents a plurality of data values and each data value is a byte of information.

13. The method of claim 11, wherein the set of the data bits represents a plurality of data values and each data value is four bytes of information.

14. The method of claim 11, wherein the set of the data bits represents a plurality of data values and each data value is a fixed number of bits of information, wherein the fixed number is equal to a bit width of a data bus of the memory device, wherein the data bus of the memory device is used to transmit the data bits and the ECC bits.

15. The method of claim 11, wherein the step of transmitting the set of data bits and the set of ECC bits together in a single burst comprises transmitting all of the set of data bits and the set of ECC bits consecutively prior to transmitting any other set of data bits and any other set of ECC bits.

16. The method of claim 11, wherein the logical operation is an AND operation or an OR operation.

17. The method of claim 11, wherein the memory device includes a first portion for storing the data bits and a second portion for storing the ECC bits.

18. The method of claim 17, wherein the first portion represents 7/8 of the memory device and the second portion represents 1/8 of the memory device.

19. The method of claim 11, wherein the memory device is operable in a first mode and a second mode,
wherein when the memory device is operating in the first mode, the memory device performs a first set of steps comprising the generating, the retrieving the set of ECC bits, and the transmitting the set of data bits and the set of ECC bits together in the single burst, and
wherein when the memory device is operating in the second mode, the memory device does not perform the first set of steps but instead performs a second set of steps comprising transmitting the set of data bits in a single burst.

20. The method of claim 11, wherein the memory device is a dynamic random access memory (DRAM).

21. A memory device, comprising:
storage; and
logic configured to:
receive a first address for a set of data bits;
retrieve the set of data bits from a first location of the storage using the first address;
generate a second address by shifting the received first address and performing a logical operation thereon;
retrieve a set of error correcting code (ECC) bits from a second location of the storage using the second address, wherein the second location is different from the first location, wherein the set of ECC bits is associated with the set of data bits; and
transmit the set of data bits and the set of ECC bits together in a single burst.

22. The memory device of claim 21, wherein the set of the data bits represents a plurality of data values and each data value is a byte of information.

23. The memory device of claim 21, wherein the set of the data bits represents a plurality of data values and each data value is four bytes of information.

24. The memory device of claim 21, wherein the set of the data bits represents a plurality of data values and each data value is a fixed number of bits of information, wherein the fixed number is equal to a bit width of a data bus of the memory device, wherein the data bus of the memory device is used to transmit the data bits and the ECC bits.

25. The memory device of claim 21, wherein the logic configured to transmit the set of data bits and the set of ECC bits together in a single burst comprises logic configured to transmit all of the set of data bits and the set of ECC bits consecutively prior to transmitting any other set of data bits and any other set of ECC bits.

26. The memory device of claim 21, wherein the logical operation is an AND operation or an OR operation.

27. The memory device of claim 21, wherein the storage includes a first portion for storing the data bits, and a second portion for storing the ECC bits.

28. The memory device of claim 27, wherein the first portion represents 7/8 of the storage and the second portion represents 1/8 of the storage.

29. The memory device of claim 21, wherein the memory device is operable in a first mode and a second mode,
wherein when the memory device is operating in the first mode, the logic is configured to perform said generate, said retrieve the set of ECC bits, and said transmit the set of data bits and the set of ECC bits together in a single burst, and
wherein when the memory device is operating in the second mode, the logic is configured instead to transmit the set of data bits in a single burst.

30. The memory device of claim 21, wherein the memory device is a dynamic random access memory (DRAM).

31. A memory device, comprising:
storage; and
logic configured to:
receive a first address for a set of data bits;
retrieve the set of data bits from a first location of the storage using the first address;
generate a second address by shifting the received first address and performing a logical operation thereon;
retrieve a set of error correcting code (ECC) bits from a second location of the storage using the second address, wherein the second location is different from the first location, wherein the set of ECC bits is associated with the set of data bits; and transmit the set of data bits and the set of ECC bits together in a single burst, wherein the addresses associated with the set data bits and the set of ECC bits do not form a consecutive, sequential set of addresses.

32. The memory device of claim 31, wherein the set of the data bits represents a plurality of data values and each data value is a byte of information.

33. The memory device of claim 31, wherein the set of the data bits represents a plurality of data values and each data value is four bytes of information.

34. The memory device of claim 31, wherein the set of the data bits represents a plurality of data values and each data value is a fixed number of bits of information, wherein the fixed number is equal to a bit width of a data bus of the memory device, wherein the data bus of the memory device is used to transmit the data bits and the ECC bits.

35. The memory device of claim 31, wherein the logic configured to transmit the set of data bits and the set of ECC bits together in a single burst comprises logic configured to transmit all of the set of data bits and the set of ECC bits consecutively prior to transmitting any other set of data bits and any other set of ECC bits.

36. The memory device of claim 31, wherein the logical operation is an AND operation or an OR operation.

37. The memory device of claim 31, wherein the storage includes a first portion for storing the data bits and a second portion for storing the ECC bits.

38. The memory device of claim 37, wherein the first portion represents 7/8 of the storage and the second portion represents 1/8 of the storage.

39. The memory device of claim 31, wherein the memory device is operable in a first mode and a second mode,
wherein when the memory device is operating in the first mode, the logic is configured to said generate, said retrieve the set of ECC bits, and said transmit the set of data bits and the set of ECC bits together in a single burst, and
wherein when the memory device is operating in the second mode, the logic is configured instead to transmit the set of data bits in a single burst.

40. The memory device of claim 31, wherein the memory device is a dynamic random access memory (DRAM).

* * * * *